Feb. 17, 1970     C. R. BARLOW     3,495,793
GRANULAR OR DRY APPLICATOR FOR FIXED-WING AIRCRAFT
Filed Feb. 23, 1968     2 Sheets-Sheet 2
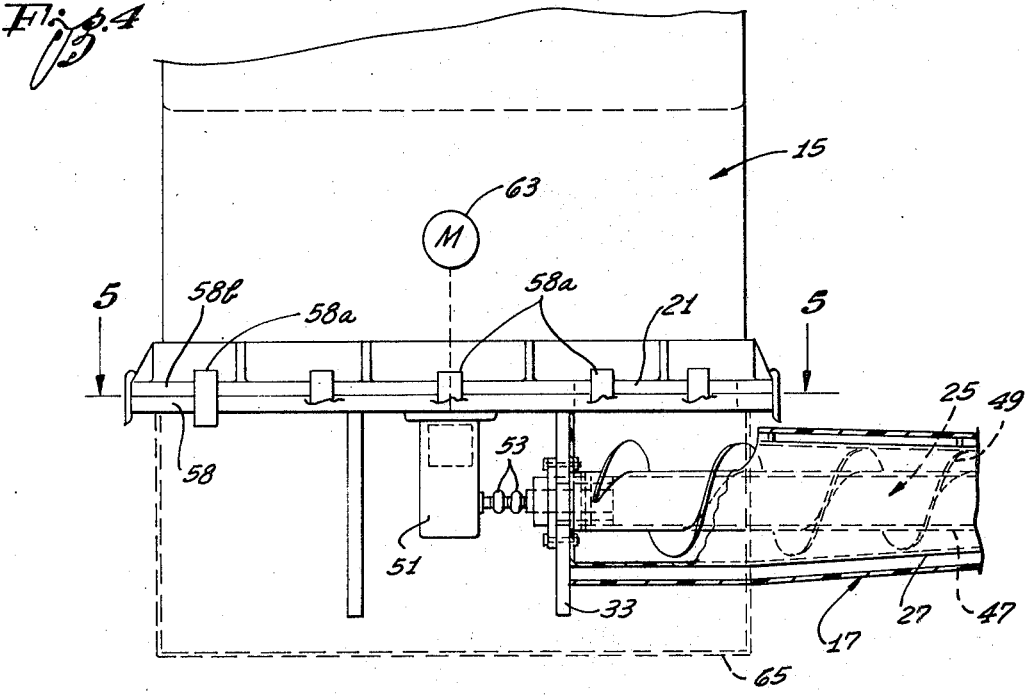
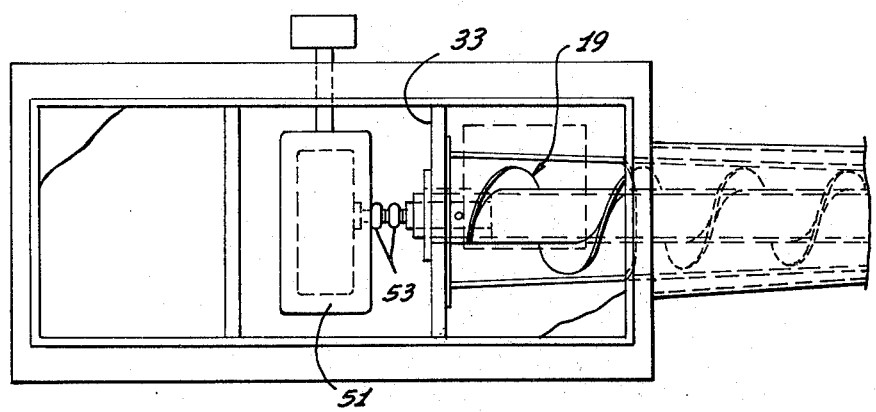
INVENTOR:
Conrad R. Barlow
ATTORNEYS

United States Patent Office 3,495,793
Patented Feb. 17, 1970

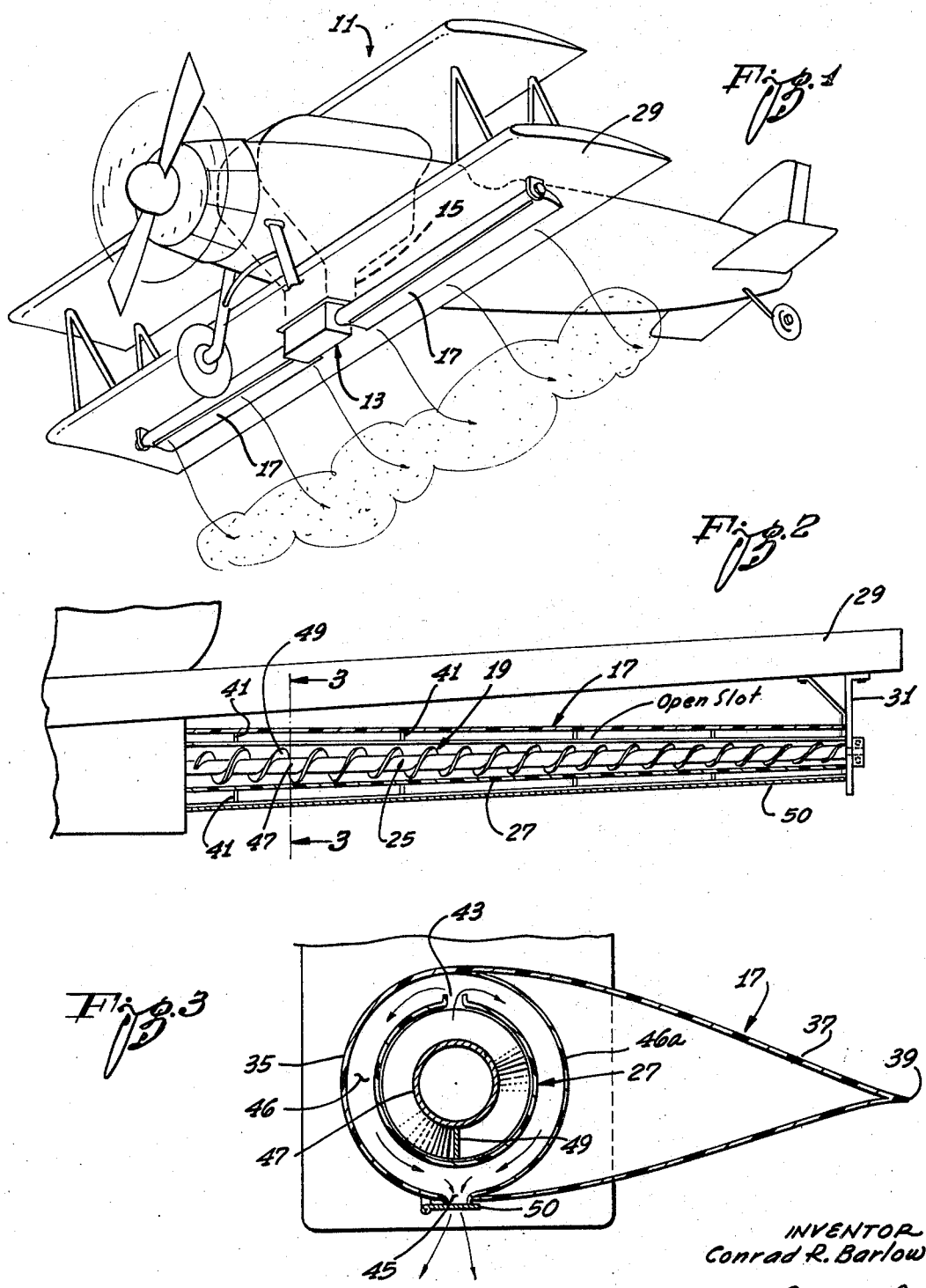

3,495,793
GRANULAR OR DRY APPLICATOR FOR FIXED-WING AIRCRAFT
Conrad R. Barlow, Redondo Beach, Calif., assignor to Transland Aircraft, Inc., Harbor City, Calif., a corporation of California
Filed Feb. 23, 1968, Ser. No. 707,637
Int. Cl. B65d 1/16
U.S. Cl. 244—136                                6 Claims

ABSTRACT OF THE DISCLOSURE

This disclosure describes an applicator which is particularly adapted for distributing various flowable materials from a fixed-wing aircraft. The appliactor may include a hopper located centrally of the aircraft for storing the flowable material and distributing means extending laterally of the hopper for conveying the material laterally of the hopper and discharging it. The distributing means is encased in a streamlined section of low drag characteristics.

Background of the invention

Various flowable materials such as chemicals, fertilizers and seeds are often distributed over an area of land from the air. To accomplish this, a spreader or applicator is connected to an airplane and when the airplane is in flight, the applicator distributes the material over the desired area.

In a typical conventional applicator of the type to which the present invention is directed, ram air is used to expel and distribute the material when the aircraft is in flight. Ram air for this purpose is obtained at the expense of the aircraft power plant. That is, a spreader operating on ram air exerts considerable drag on the airplane and may require as much as 100 horsepower to operate.

Summary of the invention

The present invention provides a spreader for flowable materials which is particularly adapted for distributing dry powdered or granular material from a fixed-wing aircraft. A primary feature of the invention is that the drag on the aircraft is substantially reduced. The present invention teaches that the drag on the airplane can be significantly reduced by eliminating the need for ram air type distribution and by encasing a substantial portion of the distributing or conveying apparatus in a streamlined shell. The flowable material may be stored in a hopper located centrally of the aircraft and the flowable material is moved by mechanical conveying means to thereby eliminate the need for ram air distribution. The mechanical conveying means moves the material laterally outwardly in the streamlined shell, which preferably extends beneath the wings. The streamlined shell has opening means extending laterally along the streamlined shell, such as an elongated slot, through which the flowable material is discharged in a relatively wide band.

The streamlined shell may be of any configuration which has low draw characteristics. In one form, the streamlined shell has a curved forward portion and a narrower tapered rearward section.

In a preferred form the mechanical conveying means includes an auger encased in a tube or sleeve. The sleeve has an elongated aperture therein through which the material being augered can flow. The material then flows between the sleeve and the shell to the slot in the shell from which it is discharged.

In order to assure that substantially equal quantities of the material will be discharged from the various regions along the length of the applicator, the flights of the auger should be reduced in volume as the auger extends outwardly. This is preferably accomplished by reducing the core diameter and the web width of the auger as the auger extends outwardly. This also permits tapering or narrowing of the shell as it extends outwardly to thereby further reduce the drag on the aircraft.

2

To further assure an even discharge and distribution of the material, the elongated aperture or slot in the sleeve should be no lower than the adjacent region of the axis of the auger to thereby preclude gravity flow through such slot. Thus, the only material passing through the slot in the sleeve will be the material forced therethrough by the auger. The slot in the shell should be lower than the slot in the sleeve to permit gravity flow of the material therebetween. Preferably the slot in the sleeve is in the uppermost region of the sleeve and the slot in the shell is in the lower side of the shell.

The wings of a fixed-wing airplane move or deflect relative to the fuselage during flight. The streamlined shell is secured to a wing and moves therewith. The auger is mounted within the streamlined shell and, therefore, also moves with the wing. In order that the auger may be rotated as is necessary to convey the flowable material while it is being subjected to movement by the wing, a flexible coupling is provided in the drive train between the auger and the drive motor therefor.

The invention, both as to its organization and method of operation together with further features and advantages thereof may best be understood by reference to the following description taken in connection with the accompanying illustrative drawing.

Brief description of the drawing

FIG. 1 is a perspective view of an airplane with parts thereof broken away to show a spreader or appliactor constructed in accordance with the teachings of this invention.

FIG. 2 is a fragmentary front elevational view of one wing of the airplane with the streamlined shell and sleeve being shown in section to expose the auger.

FIG. 3 is an enlarged fragmentary sectional view taken along line 3—3 of FIG. 2.

FIG. 4 is a fragmentary front elevational view of a central region of the aircraft showing the inner end of the auger and the fan for providing power to operate the auger.

FIG. 5 is a fragmentary top plan view taken along line 5—5 of FIG. 4.

Description of the preferred embodiments

Referring to the drawings, FIG. 1 illustrates a fixed-wing airplane 11 having an applicator 13 constructed in accordance with the teachings of this invention mounted thereon. The applicator 13 is particularly adapted for applying dry flowable material such as powdered or granular material. Generally, the applicator 13 includes a hopper 15 suitably mounted in the fuselage, a pair of streamlined shells 17 and mechanical conveying means 19 (FIG. 2) within each of the shells. The flowable material is delivered from the hopper 15 to the conveying means 19 which conveys the material outwardly for distribution from the shell 17. As a substantial portion of the distributing apparatus is encased within the streamlined shell 17, the drag on the aircraft is considerably reduced.

As shown in FIG. 4, the hopper 15 may be in the form of a container suitable to retain the flowable material which is to be spread. The hopper 15 is mounted centrally of the airplane 11 and has an opening 21 in the lower side thereof through which the flowable material can pass under the influence of gravity.

The two shells 17 and the equipment carried in each may be identical and therefore only one of the shells is shown in detail. As shown in FIGS. 2–4, the mechanical conveying means 19 includes a rotatable auger 25 and a tube, casing or sleeve 27 surrounding the auger. The shell 17 is mounted on a wing 29 of the airplane adjacent the outer end of the shell (FIG. 2) by a suitable bracket 31. The shell 17 is mounted on the hopper on the inner end of the shell by a support member 33 (FIG. 4). Both the shell 17 and the sleeve 27 have openings below the opening 21 so that the flowable material from the hopper can fall therein.

The streamlined shell 17 may be of any configuration having low drag characteristics. In the form illustrated in FIG. 3, the shell 17 has a substantially semi-cylindrical forward portion 35 and an aft portion 37 tapering smoothly from the forward portion to a narrow aft edge 39. The shell 17 may be constructed of any suitable material such as fibreglass.

The sleeve 27 is mounted within the shell 17 by a plurality of mounting brackets 41 (FIG. 2). The sleeve 27 is generally circular in cross section as shown in FIG. 3 and narrows in cross section as it extends laterally outwardly. Thus, the sleeve 27 is generally frustoconical and as shown in FIG. 3, approximately one half of the sleeve 27 lies within the forward portion 35 of the shell 17 and is generally concentric therewith. The sleeve 37 has an elongated continuous slot 43 at the upper end thereof, or at the 12 o'clock position, (FIG. 3), which extends continuously for substantially the full length of the sleeve. The shell 17 has a similar slot 45 in the lower side thereof diametrically opposed to the slot 43, which extends continuously for substantially the full length of the shell. The shell 27 is spaced from the shell 17 to define a passage 46 for the flowable material. A baffle 46a may be provided to block off a substantial section of the aft portion 37 to prevent the material from entering such section.

The auger 25 includes an elongated core 47 and a web 49 wrapped spirally about the core 47. The spiral fits within thhe sleeve 27 with a small circumferentially extending clearance space therebetween. The core 47 is preferably in the form of a hollow frustoconical tube to reduce the weight thereof and is mounted for rotation by suitable bearings within the support member 33 and the bracket 31. The web 49 and the core 47 are of progressively decreasing diameter as they extend laterally outwardly to thereby evenly and progressively reduce the volume of the flights of the auger 25 as the auger extends outwardly. By decreasing the diameter of the auger 19 the maximum vertical dimension of the shell 17 may be correspondingly reduced as it extends laterally outwardly. This arrangement serves to further reduce the drag on the airplane 11.

To assume that the discharge of material from the slot 45 will be completely and positively stopped when the auger 25 is stopped a small but elongated gate 50 may be suitably hinged to the shell 17 so that it can selectively open and close the slot 45. The gate 50 may be actuated from the cockpit of the aircraft by any suitable linkage (not shown).

The wing 29 of the airplane 11 will inherently move relative to the fuselage of the airplane during flight. As the auger 19 and the shell 17 are mounted on the wing 27, they will undergo similar movement. It is important therefore that the drive means for the auger 19 be sufficiently flexible to allow movement of the auger with the wing. As shown in FIGS. 4 and 5, the core 47 of the auger is drivingly connected to a gear box 51 by a double universal joint 53, which allows the auger 19 to undergo universal movement with respect to the gear box 51 without breaking or damaging the driving connection to the auger.

The support member 33 and the gear box 51 are suitably affixed to a mounting plate 58. The mounting plate 58 is releasably attached by quick disconnect fasteners 58a to a support plate 58b which is fixed to the airplane. The auger 25 may be driven in any suitable manner; however, in the embodiment illustrated, a fluid motor 63 which is driven by the aircraft hydraulic system is drivingly connected to the gear box 51 to rotate the auger 19.

Preferably, the inner end of the shell 17 and the gear box 51 are suitably encased in a cover 65 (FIG. 4). Although only one of the shells 17 and its associated auger 19 has been described in detail herein, it should be understood that both of the shells 17 and augers 19 are identical.

With the airplane 11 aloft, the applicator 13 can be actuated by actuating the appropriate conventional control (not shown) to cause the fluid motor 63 to drive the auger 25. The flowable material in the hopper 15 can then flow through the opening 21 into the inner end of the sleeve 27 as shown in FIG. 4. With the motor 63 driving the gear box 51, the auger 19 rotates to convey the flowable material laterally outwardly from the hopper 15. As the auger 25 rotates, it conveys the flowable material laterally outwardly and simultaneously continuously discharges some of the flowable material through the slot 43 in the sleeve 27. The discharged material flows through the passageway 46 between the tube 27 and the shell 17 downwardly under the influence of gravity through the slot 45. As material is continuously discharged from substantially the full length of the slot 43, the material is discharged in a wide band or sheet from the elongated slot 45. The baffle 46a prevents the flowable material from building up within the aft portion 37 of the sleeve 17. The rate of discharge of the flowable material can be varied by varying the speed at which the auger 19 is driven.

Although exemplary embodiments of the invention have been shown and described, many changes, modifications, and substitutions may be made by one having ordinary skill in the art without necessarily departing from the spirit and scope of this invention.

What is claimed is:

1. In an apparatus connectable to an aircraft for distributing flowable material, the combination of:
   a hopper connectable to a central portion of the aircraft for storing the flowable material;
   a rotatable auger having an inner end portion adjacent said hopper and an outer end portion laterally outwardly of said inner end portion, said auger receiving the flowable material from said hopper adjacent said inner end portion and conveying the material toward said outer end portion;
   a sleeve surrounding the auger, said sleeve having longitudinally extending opening means therein with said opening means extending through a region of the sleeve which lies no lower than the adjacent portion of the axis of the auger;
   drive means for rotating the auger to convey the material laterally outwardly and through the opening means of said sleeve in relatively even quantities along said opening means; and
   a streamlined shell connectable to the aircraft and surrounding the auger and the sleeve to thereby reduce the drag on the aircraft, said shell having longitudinally extending opening means in the lower side thereof through which the material can flow under the influence of gravity in relatively even quantities therealong.

2. A combination as defined in claim 1 including gate means for selectively opening and closing said opening means in said shell.

3. A combination as defined in claim 1 wherein said auger has a series of flights of progressively decreasing volume as the auger extends outwardly to thereby cause the auger to force relatively even quantities of material through the opening means in the sleeve and said opening means in said sleeve is in the upper portion thereof.

4. A combination as defined in claim 1 wherein said shell has a curved forward portion for housing at least a portion of the auger and a tapered section extending rearwardly of the curved forward portion, said shell having a baffle therein spaced from the sleeve on the rearward side thereof to block off at least a substantial portion of the tapered section to prevent the material from entering such tapered section.

5. In an apparatus connectable to a fixed wing aircraft for distributing dry flowable material, the combination of:
   a hopper connectable to a central portion of the aircraft for storing the flowable material;
   first and second rotatable augers, each of said augers having an inner end portion adjacent said hopper and an outer end portion laterally outwardly of said inner end portion, said augers receiving the flowable material from said hopper adjacent said inner end portions thereof and conveying the material toward said outer end portions thereof, each of said augers having a series of flights with the volume of said flights evenly and progressively decreasing as the flights extend outwardly;
   first and second streamlined shell sections connectable, respectively, to the wings of the aircraft, said first and second shell sections surrounding said first and second augers, respectively, with each of said shell sections extending laterally outwardly with its associated auger, each of said shell sections having elongated opening means in the underside thereof to permit discharge of the material conveyed by the auger at spaced regions along the shell;
   first and second sleeves surrounding said first and second augers, respectively, each of said sleeves having a slot therein spaced circumferentially from said slot in the associated shell section and being no longer than about the elevation of the adjacent portion of the axis of the auger whereby the material is augered evenly through the slots in the sleeves and flows therefrom through the slots in the shell sections under the influence of gravity;
   a motor; and
   power transmitting means for drivingly interconnecting said motor and said augers to permit said motors to rotate said augers to convey the material outwardly therealong, said power transmitting means including flexible means for permitting movement of the auger relative to the motor.

6. In an apparatus for use with an aircraft for distributing flowable material, the combination of:
   hopper means for storing the flowable material;
   a rotatable auger having an inner end portion and an outer end portion, said auger being connectable to the aircraft with the outer end portion being located laterally outwardly of said inner end portion, said auger receiving the flowable material from the hopper means adjacent the inner portion and conveying the material toward each outer end portion;
   an auger casing, said auger being positioned in said auger casing, said auger casing extending along at least a major portion of the length of the auger, said auger casing having aperture means extending along the length thereof for permitting discharge of the flowable material from the auger casing at regions along the length of the auger casing, said aperture means being positioned in a zone of the auger casing which lies no lower than approximately the adjacent portion of the axis of the auger; and
   means defining a streamlined shell at least substantially surrounding said auger to reduce the drag on the aircraft, said shell having opening means extending at least along a portion of the length thereof, said opening means being at a lower elevation than said aperture means to permit gravity flow of the flowable material from the aperture means to the opening means, said opening means discharging such flowable material at regions along the length of the shell.

References Cited

UNITED STATES PATENTS

| 3,381,922 | 5/1968 | Laing | 244—136 |
| 19,421 | 2/1858 | Helton. | |
| 2,052,626 | 9/1936 | Houghton. | |
| 2,504,787 | 4/1950 | Bailey. | |
| 2,979,273 | 4/1961 | Liebhart. | |

MILTON BUCHLER, Primary Examiner

JAMES E. PITTENGER, Assistant Examiner

U.S. Cl. X.R.

169—2; 239—171